(12) United States Patent
Ullrich

(10) Patent No.: US 7,003,878 B2
(45) Date of Patent: Feb. 28, 2006

(54) METHOD FOR PRODUCING A RING SUPPORT WITH A SHEET METAL COOLING CHANNEL WELDED THEREON

(75) Inventor: Michael Ullrich, Moeglingen (DE)

(73) Assignee: MAHLE GmbH, Stuttgart (DE)

( * ) Notice: Subject to any disclaimer, the term of this patent is extended or adjusted under 35 U.S.C. 154(b) by 20 days.

(21) Appl. No.: 10/466,309

(22) PCT Filed: Nov. 29, 2001

(86) PCT No.: PCT/DE01/04528

§ 371 (c)(1),
(2), (4) Date: Dec. 5, 2003

(87) PCT Pub. No.: WO02/055912

PCT Pub. Date: Jul. 18, 2002

(65) Prior Publication Data

US 2004/0069263 A1 Apr. 15, 2004

(30) Foreign Application Priority Data

Jan. 11, 2001 (DE) .............................. 101 00 955

(51) Int. Cl.
B21K 1/14 (2006.01)

(52) U.S. Cl. .................... 29/888.07; 29/527.5; 29/557; 29/888.073; 29/890.128; 92/176; 92/186; 123/41.16; 123/41.34; 123/41.35; 123/41.36; 123/254; 164/75; 164/98

(58) Field of Classification Search ............ 29/888.07, 29/557, 890.128, 888.073, 527.5; 123/41.16, 123/41.34, 41.35, 41.36, 254; 92/176, 186; 164/75, 98

See application file for complete search history.

(56) References Cited

U.S. PATENT DOCUMENTS

| 4,120,081 | A | * | 10/1978 | Rosch et al. | ............ 29/888.045 |
| 4,907,545 | A | * | 3/1990 | Mills | ....................... 123/41.35 |
| 5,014,658 | A | | 5/1991 | Hara et al. | |
| 6,105,540 | A | | 8/2000 | Bing et al. | |

FOREIGN PATENT DOCUMENTS

| DE | 17 25 611 | 4/1956 |
| DE | 1 097 210 | 1/1961 |
| DE | 72 12 560 | 6/1972 |
| DE | 40 05 312 | 8/1990 |
| DE | 39 27 509 | 2/1991 |
| DE | 44 38 703 | 5/1996 |
| DE | 197 50 021 | 5/1999 |
| DE | 199 54 725 | 5/2001 |
| FR | 201 88 53 | 6/1960 |
| FR | CH 34 60 68 | 6/1960 |
| FR | 20 44 242 | 2/1971 |
| GB | 12 29 346 | 4/1971 |

(Continued)

*Primary Examiner*—Derris H. Banks
*Assistant Examiner*—Hung C. Le
(74) *Attorney, Agent, or Firm*—Collard & Roe, P.C.

(57) ABSTRACT

The invention relates to a method for producing a ring support (1) with a sheet metal cooling channel welded thereon (5), which is transfused later with an aluminium melt for producing a piston. The aim of the invention is to improve the production of openings (4) for supplying and removing oil. Said openings are produced even before the transfusion of the cooled ring support. When the alfin pretreatment of the cooling ring supports occurs, said cooling channel is filled with melt and emptied again during removal front the alfin bath.

3 Claims, 2 Drawing Sheets

FOREIGN PATENT DOCUMENTS

| | | |
|---|---|---|
| JP | 02123260 | 5/1990 |
| JP | 04300125 | 10/1992 |
| JP | 05069240 | 3/1993 |
| JP | 5240347 | 9/1993 |

* cited by examiner

METHOD FOR PRODUCING A RING SUPPORT WITH A SHEET METAL COOLING CHANNEL WELDED THEREON

CROSS REFERENCE TO RELATED APPLICATIONS

Applicants claim priority under 35 U.S.C. §119 of GERMAN Application No. 101 00 955.0 filed on 11 Jan. 2001. Applicants also claim priority under 35 U.S.C. §365 of PCT/DE01/04528 filed on 29 Nov. 2001. The international application under PCT article 21(2) was not published in English.

The invention relates to a method for producing a ring support with a sheet metal cooling channel welded thereon, as defined in the introductory part of claim 1.

Such ring supports are known, for example from DE 197 50021 A, U.S. Pat. No. 4,907,545, JP 5-240347, or DE 721 2560 U. The ring supports with the cooling channel are cast in this connection in the closed condition, and openings for feeding the cooling oil are drilled only after the piston has been produced. Since the material of the sheet metal cooling channel consists of austenitic steel in the normal case, starting the drilling and the removal of the burrs are found to be difficult.

The invention is therefore dealing with the problem of finding in connection with the basic process of the type specified above a simple method for producing the openings in the cooling channel.

This problem is resolved by the characterizing feature of claim 1. Beneficial further developments of the invention are the objects of the dependent claims.

Producing the openings before the cooling channel ring support is transfused is found to be distinctly simpler. The melt penetrating the sheet metal cooling channel in the alfin pretreatment is found not to pose any drawback because it can run out to a large extent after the cooling channel ring support has been removed from the alfin bath.

In the production of the piston in the iron mold, the cooling channel ring support is beneficially retained by sleeves, which, at the same time, seal the openings of the sheet metal cooling channel.

The invention is explained in greater detail in the following with the help of a drawing, in which.

Figure 1:
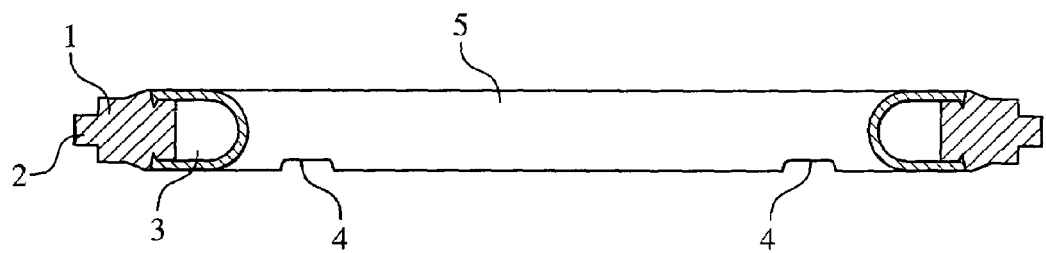
FIG. 1 shows a ring support with a sheet metal cooling channel and openings, which are produced prior to the transfusion (cross sectional view).

The ring support 1 comprises an outer retaining ring 2 and an inner side 3, which jointly with the sheet metal ring or the sheet metal cooling channel 5 are forming a closed cooling channel of a piston for internal combustion engines. The ring support 1 and the sheet metal ring 5 are fused with each other.

Figure 2:
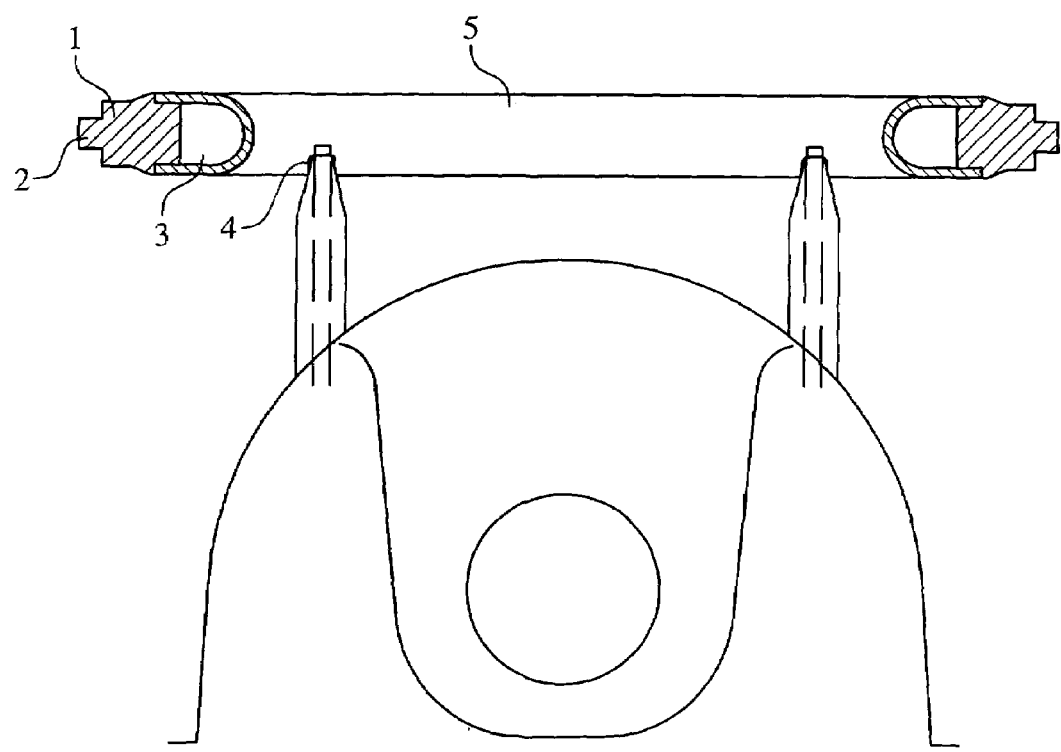
FIG. 2 shows the ring support of FIG. 1 positioned in an iron mold and the opening of the cooling channel closed by sleeves vented on the inside.

As shown in FIG. 2, the sheet metal ring 5 is provided with the openings 4, with which the cooling channel ring support is later plugged onto the sleeves of an iron mold. The sleeves are vented in this connection on the inside and the diameter of the sleeves is adapted to the openings 4 in such a manner that the melt is largely prevented from penetrating the sheet metal cooling channel when the piston is transfused.

What is claimed is:

1. A method for producing a ring support with a sheet metal cooling channel welded thereon, whereby the sheet metal cooling channel has openings for supplying and removing oil, and whereby the ring support with the cooling channel welded thereon is alfinized after its production in an immersion bath, and subsequently transfused in an iron mold with melt for producing a piston, wherein the openings of the sheet metal cooling channel are produced prior to the transfusion and are closed by sleeves positioning at the same time the ring support with the sheet metal cooling channel in the iron mold.

2. The method according to claim 1, wherein the cooling channel is filled with melt during the alfin pretreatment.

3. The method according to claim 1, wherein the sleeves are vented on the inside.

* * * * *